Aug. 7, 1956 L. E. NORTON 2,758,246

SIGNAL FREQUENCY DIVIDERS

Filed Feb. 1, 1951 3 Sheets-Sheet 1

INVENTOR
Lowell E. Norton
BY J. L. Whittaker
ATTORNEY

SIGNAL FREQUENCY DIVIDERS

Filed Feb. 1, 1951 3 Sheets-Sheet 2

INVENTOR
Lowell E. Norton
BY
J. L. Whittaker
ATTORNEY

Aug. 7, 1956 L. E. NORTON 2,758,246

SIGNAL FREQUENCY DIVIDERS

Filed Feb. 1, 1951 3 Sheets-Sheet 3

INVENTOR
Lowell E. Norton
BY J. L. Whittaker
ATTORNEY 2,758,246

SIGNAL FREQUENCY DIVIDERS

Lowell E. Norton, Princeton, N. J., assignor to Radio Corporation of America, a corporation of Delaware Application February 1, 1951, Serial No. 208,956

7 Claims. (Cl. 315—6)

Figure 1:
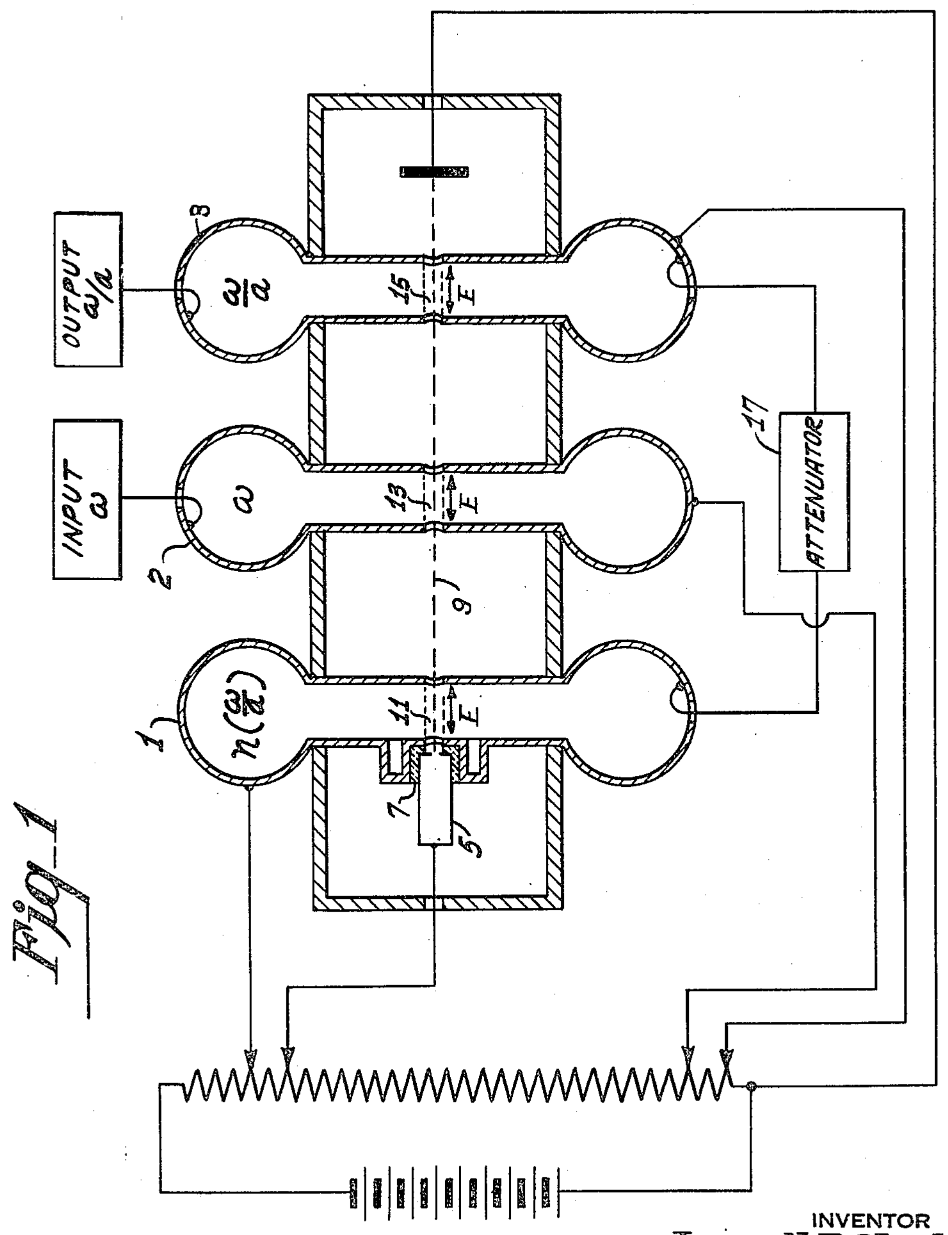

This invention relates generally to signal frequency dividers and more particularly to microwave frequency dividers.

Conventional vacuum tube frequency dividers generally are not used at microwave frequencies since the interelectrode capacitances existing between conventional vacuum tube electrodes make operation at these high frequencies inefficient or impractical. In general, many previous microwave frequency dividing systems obtain frequency division by complicated and awkward means.

Suppose, for example, it is desired to obtain a signal frequency of 8,000 megacycles per second. According to one of these previously known systems, a microwave generator is tuned to and delivers an output signal of approximately the desired frequency. The generator output is fed to a harmonic generator wherein the third harmonic of the applied signal frequency is obtained. This third harmonic signal has a frequency of approximately 24,000 megacycles and may be coupled to a frequency stabilizer gas cell as is described in a copending application of William Delmar Hershberger, Serial No. 786,736, filed November 18, 1947, now Patent No. 2,702,350, issued February 15, 1955. The frequency stabilizer cell encloses a microwave absorptive resonant gas which has a maximum absorption band of electromagnetic energy at the resonant frequency of the enclosed gas. Smaller amounts of energy are absorbed at frequencies other than the resonant frequency. A voltage, its magnitude depending upon the deviation of the aforementioned harmonic frequency from the resonant frequency of the microwave absorptive gas is derived which voltage may be applied to a frequency control electrode of the 8,000 megacycle generator thereby correcting its frequency to an exact sub-multiple of 24,000 megacycles. While this system does not employ conventional frequency dividing methods, it effectively attains the same end result. It is convenient, however, to have available a simpler and better frequency dividing arrangement.

According to the present invention, an improved frequency dividing system is provided which subdivides an applied signal frequency more directly.

An object of the invention is to provide an improved frequency dividing system.

Another object of the invention is to provide a simplified frequency dividing system.

A further object of the invention is to provide an improved and simplified frequency dividing system for frequency stabilization at microwave frequencies.

A typical system according to the present invention includes a klystron microwave device having an emissive cathode and a plurality of cavity resonators. In a first embodiment, according to the invention, there are three cavity resonators, axially displaced from a cathode and mutually coupled by an electron beam emitted by the cathode, the beam successively passing through the three cavities. The cavity resonators are hereinafter called the feedback, input, and output resonators, respectively.

In operation, energy at a selected harmonic of the desired output signal frequency is coupled from the output resonator to the feedback resonator by an attenuator. This coupled, or feed-back, energy density-modulates the electron beam which is common to all three cavity resonators. The applied signal frequency being subdivided is introduced into the input resonator thereby further modulating the electron beam and effectively mixing with the feedback harmonic energy. A signal frequency may be derived from this mixing sustaining an output signal of the desired frequency from the output resonator.

A second embodiment, according to the invention, discloses means wherein a similar feedback resonator is physically re-oriented and the electron beam, in this case, is deflection modulated.

The invention will be described in greater detail with reference to the accompanying drawing of which:

Figure 1 is a partially cross-section view schematically illustrating a frequency dividing device, according to the invention, in which the electric fields of the three cavity resonators, coupled by a cathode ray beam, are parallel to the path of the beam at its point of passage through the cavity resonators.

Figure 2:
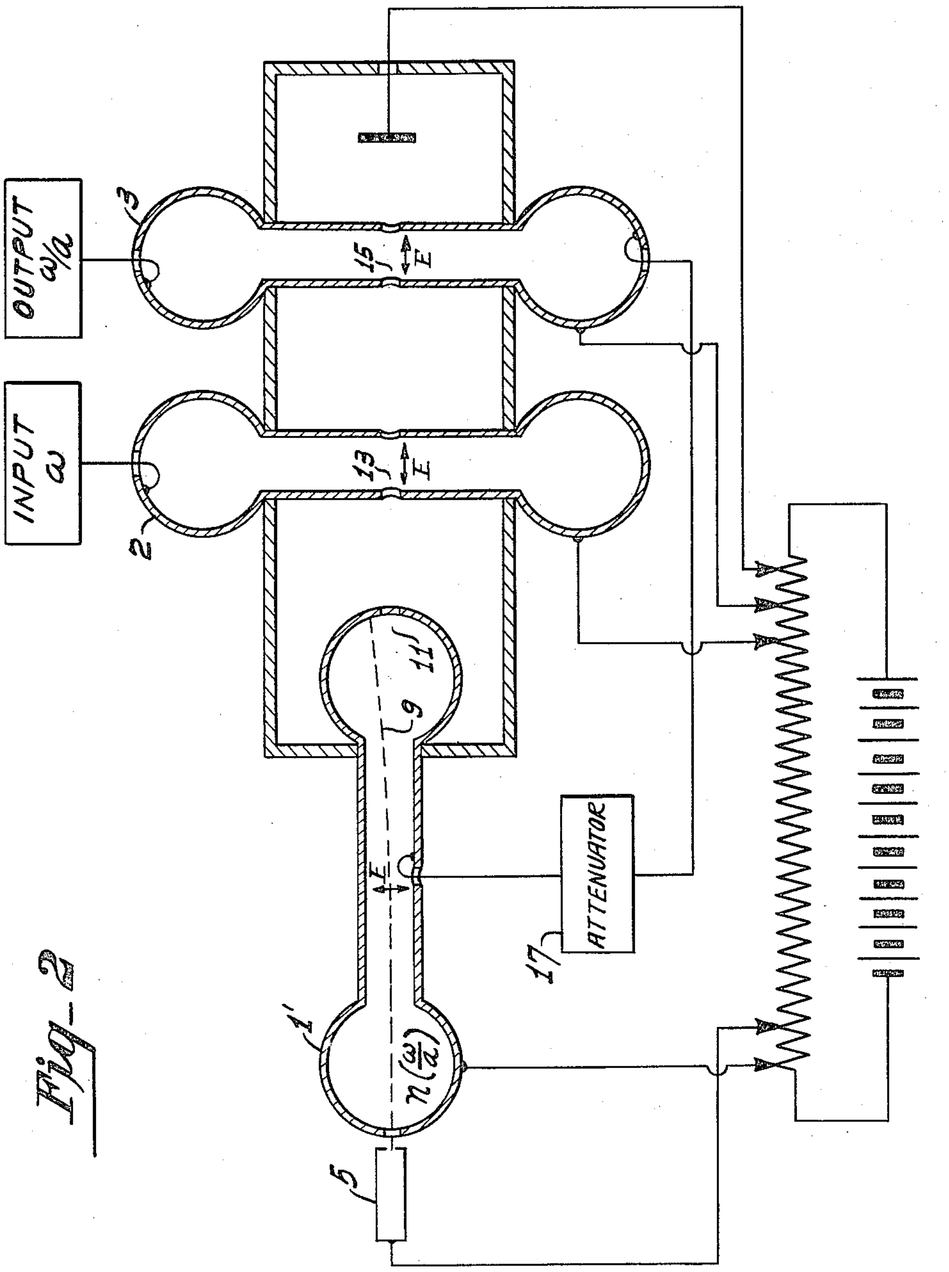
Figures 3, 4:
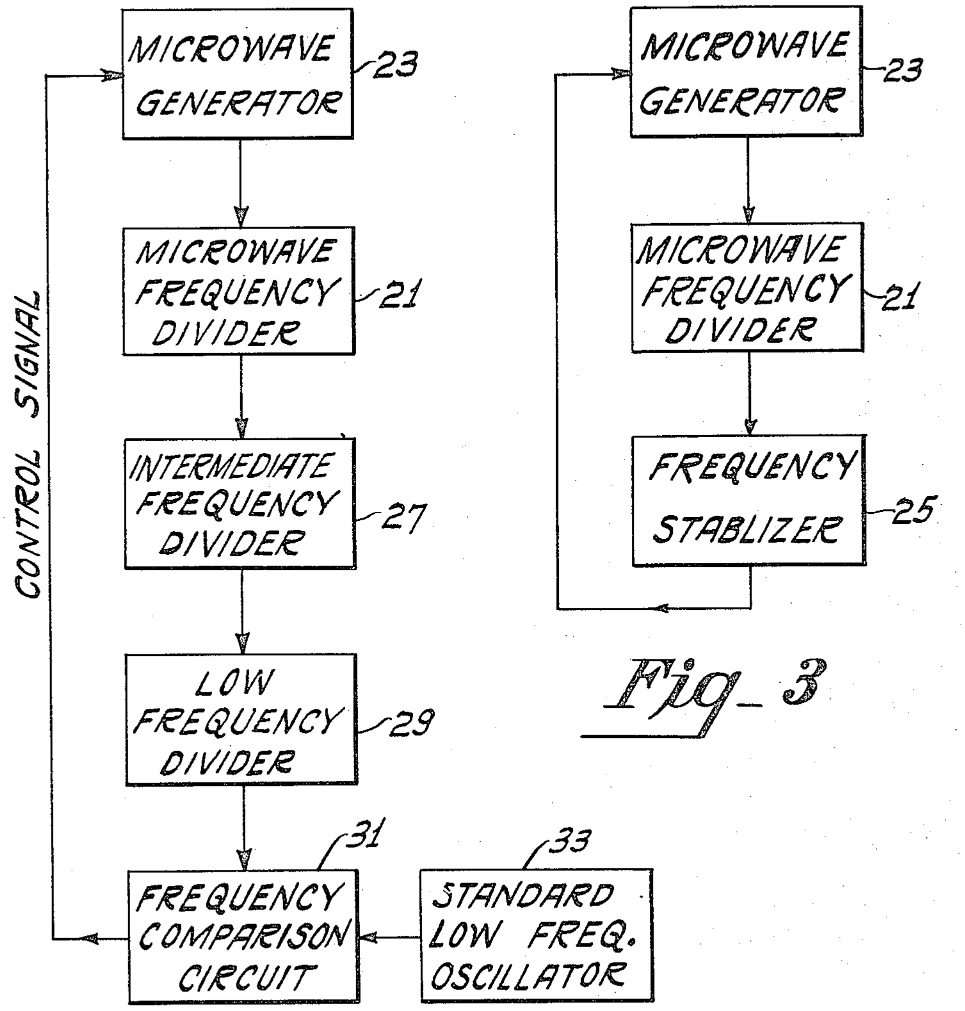

Figure 2 is a partial cross-section view schematically illustrating a frequency dividing device, according to the invention, in which the electric field of one of said frequency divider cavity resonators coupled by a cathode ray beam, is normal to the path of an emitted electron beam at its point of passage through said resonator; and Figure 3 is a schematic circuit diagram, in block form, in which microwave frequency stabilization is secured utilizing a frequency divider of either Figure 1 or Figure 2.

Figure 4 is a schematic diagram, in block form, in which a series of frequency dividers, including a frequency divider of either Figure 1 or Figure 2, are cascaded and are utilized to secure microwave frequency stabilization.

Like reference characters are applied to like elements throughout the drawing.

In a first embodiment, according to the invention, referring to Figure 1 of the drawing, the frequency divider includes a microwave frequency dividing device having three cavity resonators, feedback, input and output resonators 1, 2, and 3 respectively, and an electron emissive cathode electrode 5. The feedback resonator 1 is next adjacent and biased negatively with respect to the cathode electrode 5 and is insulated therefrom by a thin dielectric spacer 7 having a thickness ordinarily small as compared to the operating wavelength of the feedback resonator 1. The feedback resonator 1 is tuned to a selected *n*th harmonic of the desired output signal frequency $$\frac{\omega}{a}$$

where $\omega$ is the applied signal frequency to be subdivided and $a$ is an integer designating the desired frequency division ratio. The output resonator 3, which is located furthest from the cathode electrode 5, is tuned to $$\frac{\omega}{a}$$

and the input resonator 2 is interposed between the feedback and output resonators 1, 3 and is tuned to the applied signal frequency $\omega$. The electric fields, denoted by double ended vectors designated by the symbol E, of the several cavity resonators 1, 2, and 3 are respectively parallel to the path of an electron beam 9, at its point of passage through any particular resonator, emitted by the cathode electrode 5. The beam 9 successively passes through apertures 11, 13, and 15 in the respective cavity resonators 1, 2, and 3, thereby mutually coupling said resonators. The feedback and output resonators 1, 3 are externally coupled by means preferably including an attenuator 17.

In operation, a selected $n$th harmonic of the desired output signal frequency $$\frac{\omega}{a}$$

is coupled from the output resonator 3 to the feedback resonator 1 by means including an attenuator 17 which attenuates the feedback energy sufficiently so that the feedback and output resonators 1 and 3 do not operate to oscillate independently as a two-cavity klystron. Energy coupled to the feedback resonator 1, which is insulated from the cathode electrode 5 by the thin dielectric spacer 7, has a large measure of control over the emitted electron beam 9 because of the close proximity of the feedback resonator 1 to the cathode 5. Since the electric field of the feedback resonator 1 is substantially parallel to the path of said beam 9, the feedback energy of frequency $$n\left(\frac{\omega}{a}\right)$$

density modulates the beam 9. The electron beam 9, common also to the input resonator 2 is further modulated therein by the applied signal of frequency $\omega$. The two signals of frequencies $$n\left(\frac{\omega}{a}\right)$$

and $\omega$ are effectively heterodyned together and the difference frequency generated is equal to the output signal frequency $$\frac{\omega}{a}$$

thereby sustaining an output signal in the output resonator 3 provided that the input signal at frequency $\omega$ is large enough so that the overall loop gain, including heterodyning, is unity at frequency $$\frac{\omega}{a}$$

The selected $n$th harmonic $n$ to which the feedback cavity resonator 1 may be tuned to provide the desired results is ascertained by setting up a frequency relation for the frequency divider circuit.

For the lower sideband of said heterodyning the relation is, $$\omega-n\left(\frac{\omega}{a}\right)=\frac{\omega}{a};\frac{\omega}{a}=\frac{\omega}{(n+1)};\text{ and } n=a-1$$

Similarly, for the upper sideband, $$n\left(\frac{\omega}{a}\right)-\omega=\frac{\omega}{a};\frac{\omega}{a}=\frac{\omega}{(n-1)},\text{ and } n=a+1$$

It is preferred to tune the feedback cavity resonator 1 below the input frequency in order to obtain degenerative action on phase and frequency modulation of the output and hence obtain more stable operation.

Harmonic generation of the beat frequency $$\frac{\omega}{a}$$

may be enhanced by the feedback energy being of sufficient amplitude to periodically cut off the electron beam 9 emitted by the cathode electrode 5. It may be desirable, however, to normally bias the electron beam to cut-off and allow the feedback energy to cause conduction.

In a second embodiment, according to the invention and referring to Figure 2 of the drawing, a feedback resonator 1′ is physically oriented such that, unlike that of Figure 1, the electric field of the feedback resonator 1′ is normal to the path of the emitted electron beam 9 at its point of passage through the resonator 1′. The electric fields of the input and output cavity resonators 2 and 3 are parallel to the path of said beam 9 at its point of passage through the respective resonators 2, 3. The energy being fed back by the attenuator 17 from the output resonator 3 to the feedback cavity resonator 1′ here deflection modulates the electron beam 9. Harmonic generation of the output frequency $$\frac{\omega}{a}$$

is here enhanced by the feedback energy being of sufficient amplitude to deflect the beam 9 such that it does not pass through the feedback resonator 1′. As the amplitude of a particular cycle of feedback energy decreases, the beam 9 then is again permitted to pass through the aperture 11 in the feedback resonator 1′ and thence through the input and output resonators 2, 3 respectively. The electron beam 9 thus is rich in harmonics of the desired output frequency $$\frac{\omega}{a}$$

Another method of enhancing harmonic generation is to suitably shape the apertures 11, 13, and 15 associated with the feedback, input, and output resonators 1′, 2, and 3 respectively such that the output is rich in desired harmonics of $$\frac{\omega}{a}$$

The operation of this embodiment is similar to and will be clear from the operation of the frequency divider of Figure 1.

Referring to Figure 3 of the drawing, the frequency divider 21, which may be either that of Fig. 1 or Fig. 2, may be used in combination with a microwave generator 23 and a frequency stabilizer 25 for frequency stabilization when a particular operating frequency is higher than usable spectral line frequencies. The output from the microwave generator 23 is coupled to a frequency divider 21 (either that of Figure 1 or Figure 2 of the instant invention). A subdivided frequency is obtained from the divider 21 and applied to a frequency stabilizer 25 as described by William Delmar Hershberger in his application Serial No. 786,736, filed November 18, 1947, now patent No. 2,702,350 issued February 15, 1955. A control voltage, dependent upon the deviation in frequency from the resonant frequency of a microwave gas in the frequency stabilizer 25, is obtained and applied to the microwave generator 23 thereby stabilizing its frequency.

The instant invention may further be utilized in bridging the frequency dividing gap existing between microwave frequencies and conventional low frequency standards. The output from a microwave generator 23, referring to Figure 4 of the drawing is subdivided by a microwave frequency divider 21, according to the instant invention. The signal frequency derived from the microwave frequency divider 21 is further divided in an intermediate frequency divider 27, as is described in my copending application Serial No. 207,187, filed January 22, 1951, and entitled "Signal Frequency Dividers," now patent No. 2,688,701, issued September 7, 1954. The signal frequency thus obtained from the intermediate frequency divider 27 is coupled to a frequency divider 29 and a low frequency output is obtained therefrom which is applied to a signal frequency comparison circuit 31. The signal frequency derived from the cascaded frequency dividers 21, 27 and 29 is compared with the signal frequency of a low frequency standard 33. A frequency control signal may be derived from the comparison of the two signals and may be applied to a frequency control electrode of the microwave generator 23 thereby stabilizing its frequency.

What I claim to be my invention is:

1. A frequency dividing system comprising a microwave device having a cathode electrode, an input cavity resonator tuned to an applied signal frequency, an output cavity resonator tuned to a desired sub-multiple of said applied signal frequency, and a feedback cavity resonator tuned to a selected harmonic of said desired sub-multiple signal frequency, means for deriving an electron beam from said cathode electrode, means for projecting said beam through said resonators, means comprising an attenuator coupling said output signal frequency from said output cavity resonator to said feedback cavity resonator whereby said electron beam is modulated by an electromagnetic field sustained therein at said selected harmonic frequency, and means modulating said modulated beam with said applied signal for deriving a difference signal modulation of said beam equal to and sustaining an output signal from said output cavity resonator at said desired output signal frequency.

2. A system according to claim 1 wherein said input cavity resonator, said output cavity resonator, and said feedback cavity resonator include electric fields substantially parallel to the path of said electron beam at its point of passage through said resonators.

3. A system according to claim 1 wherein said feedback cavity resonator is insulated from said cathode electrode by a thin dielectric spacer.

4. A system for dividing an applied signal of frequency $\omega$ by a desired integer $a$ to obtain an output signal of frequency $$\frac{\omega}{a}$$

comprising a single klystron having at least three spaced apart cavity resonators, means for providing a charged particle beam, means for successively coupling said beam to a first, a second and a third of said resonators, said first of said resonators being tuned to sustain a selected harmonic $$\frac{n\omega}{a}$$

of said output signal of frequency $$\frac{\omega}{a}$$

said second resonator being tuned to said applied signal frequency $\omega$, said third resonator being tuned to sustain said output signal frequency $$\frac{\omega}{a}$$

means coupled to said second one of said resonators for modulating said beam with said applied signal of frequency $\omega$, means for applying only said output signal of frequency $$\frac{\omega}{a}$$

to said first resonator by coupling said third resonator to said first resonator, and means for deriving said output signal of frequency $$\frac{\omega}{a}$$

from said third resonator.

5. A frequency dividing system comprising a microwave device having a cathode electrode, an input cavity resonator tuned to an applied signal frequency, an output cavity resonator tuned to a desired sub-multiple of said applied signal frequency and a feedback cavity resonator tuned to a selected harmonic of said desired sub-multiple signal frequency, means for deriving an electron beam from said cathode electrode, means for projecting said beam through said resonators, means comprising an attenuator coupling said output signal frequency from said output cavity resonator to said feedback cavity resonator whereby said electron beam is modulated by an electromagnetic field sustained therein at said selected harmonic frequency, means for modulating said modulated beam with said applied signal for deriving a difference signal modulation of said beam equal to and sustaining an output signal from said output cavity resonator at said desired output signal frequency, said feedback cavity resonator including an electric field substantially normal to the path of said electron beam at its point of passage through said resonator, said input and output cavity resonators including electric fields substantially parallel to said path of said electron beam at its point of passage through said input and output resonators respectively, and means in said feedback cavity resonator for obstructing said electron beam in response to said selected harmonic of said desired output signal frequency.

6. A frequency dividing system comprising a microwave device having a cathode electrode, an input cavity resonator tuned to an applied signal frequency, an output cavity resonator tuned to a desired sub-multiple of said applied signal frequency, and a feedback cavity resonator tuned to a selected harmonic of said desired sub-multiple signal frequency, means for deriving an electron beam from said cathode electrode, means for projecting said beam through said resonators, means comprising an attenuator coupling said output signal frequency from said output cavity resonator to said feedback cavity resonator whereby said electron beam is modulated by an electromagnetic field sustained therein at said selected harmonic frequency, means for modulating said modulated beam with said applied signal for deriving a difference signal modulation of said beam equal to and sustaining an output signal from said output cavity resonator at said desired output signal frequency, and said coupling means comprising means to bias said electron beam to cutoff in response to said selected harmonic of said desired output signal frequency.

7. A frequency dividing system comprising a microwave device having a cathode electrode, an input cavity resonator tuned to an applied signal frequency, an output cavity resonator tuned to a desired sub-multiple of said applied signal frequency, and a feedback cavity resonator tuned to a selected harmonic of said desired sub-multiple signal frequency, means for deriving an electron beam from said cathode electrode, means for projecting said beam through said resonators, means comprising an attenuator coupling said output signal frequency from said output cavity resonator to said feedback cavity resonator whereby said electron beam is modulated by an electromagnetic field sustained therein at said selected harmonic frequency, means for modulating said modulated beam with said applied signal for deriving a difference signal modulation of said beam equal to and sustaining an output signal from said output cavity resonator at said desired output signal frequency, means to bias said cathode electrode to cut-off, and said coupling means comprising means to bias said cathode electrode above cut-off in response to said selected harmonic of said desired output signal frequency whereby said electron beam is enriched in harmonics of said desired output signal frequency.

References Cited in the file of this patent

UNITED STATES PATENTS

| | | |
|---|---|---|
| Re. 22,990 | Hansen et al. | Mar. 23, 1948 |
| 2,284,751 | Linder | June 2, 1942 |
| 2,369,268 | Trevor | Feb. 13, 1945 |
| 2,414,843 | Varian | Jan. 28, 1947 |
| 2,424,959 | Alford | Aug. 5, 1947 |
| 2,452,048 | Hansen | Oct. 26, 1948 |
| 2,452,566 | Hansen | Nov. 2, 1948 |